United States Patent
Armando (10) Patent No.: US 12,479,655 B2
(45) Date of Patent: Nov. 25, 2025

(54) CONTAINER FOR WASTE COLLECTION

(71) Applicant: Nord Engineering S.P.A., Caraglio (IT)

(72) Inventor: Massimo Armando, Cuneo (IT)

(73) Assignee: Nord Engineering S.P.A., Caraglio (IT)

( * ) Notice: Subject to any disclaimer, the term of this patent is extended or adjusted under 35 U.S.C. 154(b) by 170 days.

(21) Appl. No.: 17/774,561

(22) PCT Filed: Nov. 5, 2020

(86) PCT No.: PCT/IB2020/060403
§ 371 (c)(1),
(2) Date: May 5, 2022

(87) PCT Pub. No.: WO2021/090223
PCT Pub. Date: May 14, 2021

(65) Prior Publication Data
US 2022/0388769 A1    Dec. 8, 2022

(30) Foreign Application Priority Data

Nov. 5, 2019   (IT) .......................... 102019000020346

(51) Int. Cl.
*B65F 1/16*    (2006.01)
*B65F 1/14*    (2006.01)

(52) U.S. Cl.
CPC .......... *B65F 1/1646* (2013.01); *B65F 1/1426* (2013.01)

(58) Field of Classification Search
CPC .................. B65F 1/1646; B65F 1/1426; B65F 2210/1121; B65F 1/1607
(Continued)

(56) References Cited

U.S. PATENT DOCUMENTS

| 63,665 A * | 4/1867 | Stafford .................... B62B 1/18 220/252 |
| 269,961 A * | 1/1883 | Ross .................. A47G 29/1225 232/36 |

(Continued)

FOREIGN PATENT DOCUMENTS

| AT | 413278 B | * 12/2005 | .............. B65F 1/067 |
| DE | 20 2015 100671 U1 | 5/2016 | |

(Continued)

OTHER PUBLICATIONS

English translation of KR 200396207 (Year: 2005).*
(Continued)

*Primary Examiner* — Don M Anderson
*Assistant Examiner* — Eric C Baldrighi
(74) *Attorney, Agent, or Firm* — Workman Nydegger (57) ABSTRACT

A container for waste collection includes: a containment body having a collection compartment and a top opening for delivering waste into the collection compartment; a door movably connected to the containment body for selectively opening or closing the opening; a mask interposed between the collection compartment and the door when the door is in a first operating condition in which it closes the opening, the mask having at least one mouth for delivering waste into the collection compartment. The mask is permanently fixed to the containment body so that it defines a slit between an upper edge of the mask and the containment body, the slit being adapted to permit the passage of the door, wherein the door is constrained to the containment body by an actuator that allows the door to alternately switch from a first operating condition in which it closes the load opening to a second operating condition in which it opens the load opening.

17 Claims, 4 Drawing Sheets

(58) Field of Classification Search
USPC .................................................. 220/345.1
See application file for complete search history.

(56) References Cited

U.S. PATENT DOCUMENTS

| | | | | |
|---|---|---|---|---|
| 830,050 | A * | 9/1906 | Carnes | B65D 43/12 |
| | | | | 220/345.3 |
| 1,883,646 | A * | 10/1932 | Ellis | D06F 37/10 |
| | | | | 220/213 |
| 2,949,208 | A * | 8/1960 | Widigen | D06F 37/28 |
| | | | | 16/400 |
| 4,953,732 | A * | 9/1990 | Cocks | A61B 50/37 |
| | | | | 220/908 |
| 5,881,896 | A * | 3/1999 | Presnell | B65F 1/1607 |
| | | | | 220/252 |
| 6,519,130 | B1 * | 2/2003 | Breslow | B65F 1/1638 |
| | | | | 361/170 |
| 7,596,844 | B2 * | 10/2009 | Japuntich | A61B 50/36 |
| | | | | 29/407.01 |
| 9,586,755 | B1 * | 3/2017 | Yang | B65F 1/1638 |
| 10,457,475 | B2 * | 10/2019 | Nickerson | B65D 83/049 |
| 10,494,175 | B2 * | 12/2019 | Yang | B65F 1/163 |
| 2003/0111470 | A1 * | 6/2003 | Fouillet | B30B 9/26 |
| | | | | 220/262 |
| 2004/0016756 | A1 * | 1/2004 | Lin | B65F 1/163 |
| | | | | 220/908 |

FOREIGN PATENT DOCUMENTS

| | | | | |
|---|---|---|---|---|
| EP | 0 903 305 | A1 | 3/1999 | |
| EP | 1 172 308 | B1 | 9/2004 | |
| ES | 2938325 | T3 * | 4/2023 | ............ B65F 1/0046 |
| IT | 1400691 | | 5/2010 | |
| IT | MI20 100 826 | A1 | 11/2011 | |
| KR | 200396207 | Y1 * | 9/2005 | ............... B65F 1/00 |
| KR | 20100094645 | A * | 8/2010 | ............ B65G 53/46 |
| NL | 1 007 064 | C1 | 3/1999 | |
| TW | 201430197 | A * | 8/2014 | ............... B65F 5/00 |

OTHER PUBLICATIONS

English translation of KR 20100094645 (Year: 2010).*
English translation of TW 201430197 (Year: 2014).*
International Search Report dated Mar. 15, 2021, issued in PCT Application No. PCT/IB2020/060403, filed Nov. 5, 2020.
Written Opinion dated Mar. 15, 2021, issued in PCT Application No. PCT/IB2020/060403, filed Nov. 5, 2020.
International Preliminary Report on Patentability dated May 10, 2022, issued in PCT Application No. PCT/IB2020/060403, filed Nov. 5, 2020.

* cited by examiner

CONTAINER FOR WASTE COLLECTION

BACKGROUND OF THE INVENTION

1. The Field of the Invention

The present invention relates to a container for waste collection, in particular for differentiated waste collection.

2. The Relevant Technology

Several containers are known in the art which are intended for waste collection, in particular for differentiated waste collection (i.e., for separately collecting different materials of different types of waste, e.g., glass, paper, plastic, etc.), wherein the container comprises a hooking element for lifting and moving it, in particular by means of a motor vehicle, in order to handle and/or discharge the contents of such containers.

In the field of differentiated waste collection it is known that the division of the waste into homogeneous categories is more effective when the waste is delivered separately from the start, i.e., by the users (whether domestic or not); the various single-material waste fractions are then brought to differentiated waste collection centres distributed on the territory.

For the purpose of increasing the percentage of properly differentiated waste, several systems are known in the art which are adapted to educate and stimulate users to perform such task.

In fact, the known collection systems are so realized as to comprise a number of containers, wherein each container is used for the collection of a given type of waste (e.g., glass, paper, plastic, etc.) and may be so equipped as to comprise recognition means adapted to identify a user and allow him/her to use the container for separately delivering the waste. Such recognition means make it possible to verify that the various users have deposited the waste correctly, and therefore offer the possibility of educating them to properly carry out such task, e.g., by fining the user when a wrong behaviour is detected or (on the contrary) by assigning a bonus when the user behaves correctly, e.g., considering a given reference period.

The collection containers known in the art may also be equipped with waste weighing and/or identification and/or volumetric limitation devices, said devices being usually of the electronic type and adapted to measure the waste delivered by each user in terms of weight and/or type and/or volume, e.g., so as to obtain data useful for the application of taxes and/or fines to be paid by each user.

However, the containers known in the art suffer from significant drawbacks, in that both the provision of recognition means adapted to identify the user in order to allow him/her to deliver waste and to check that such delivery is carried out correctly and the provision of electronic waste weighing and/or identification and/or volumetric limitation devices inevitably result in considerable complications for the users; moreover, such provisions imply a considerable increase in the costs incurred for making the various dumpsters, such cost increase not always being counterbalanced by an actual improvement of the collection service.

Another drawback of known containers lies in the fact that they are all provided with access openings, through which waste can be introduced, having substantially the same shape, as opposed to different shapes according to the type of waste to be introduced; as a consequence, it is clear that the containers known in the art do not condition the user to carefully separate the different types of waste.

In an attempt to solve these and also other problems suffered by the containers known in the art, Italian patent No. 1400691 in the name of Studio Life S.r.l. proposes a container for differentiated waste collection which comprises:

a containment body within which there is a waste collection compartment provided with at least one top opening, a cover movably connected to said containment body for opening or closing the access opening of the collection compartment, a mask applied to the top opening of the collection compartment and interposed between the containment body and the cover, wherein the mask is provided with a plurality of mouths for delivering waste into the collection compartment, said mouths being suitably shaped according to the size and shape of the single pieces of waste to be introduced and being formed in a movable panel extending over the entire surface extension of the top opening.

In particular, the mouths may have a circular, rectangular or square section and dimensions suitable for the insertion of appropriately separated waste; moreover, the mask may be coloured with colours assigned to a given type of waste to be delivered, and may show various instructions about waste delivery.

The provisions of Italian patent No. 1400691, and in particular those concerning the mask movably applied to the top opening of the collection compartment, make it possible to keep the existing containers substantially unchanged without them needing any invasive modifications; as a consequence, such provisions allow for easy and quick installation on any type of container.

At the same time, the provisions concerning the mask applied to the top opening of the collection compartment make it possible to draw the attention of the user to making a high-quality waste delivery, providing him/her with indications about the type of waste that can be introduced and about any particular operations necessary for such delivery.

However, even the container described in Italian patent No. 1400691 has a few drawbacks.

In particular, the container of said patent has a cover that is movably connected to said containment body (for opening or closing the access opening of the collection compartment) by means of hinges, so that it can switch from a first configuration, in which it closes the top opening of the collection compartment, to a second configuration, in which it rotates about the hinges to completely open said top opening of the collection compartment.

Even though such provisions are effective in solving the problem of permitting the removal of the waste from the container by overturning it, the switching of the door from the first configuration in which it closes the top opening to the second configuration in which it opens the top opening, and vice versa, is rather uncomfortable and laborious for the user, who must raise such cover in order to turn it about the hinges and open it so as to be able to introduce the waste; moreover, the user must then accompany the cover in its rotational movement about the hinges in order to close it after having deposited the waste.

It is evident that such operations are rather uncomfortable, especially when the user has to deposit bulky and/or heavy waste; in such situations, in fact, the user must make a considerable effort for both opening and closing the door via its rotational movement about the hinges that connect it to the containment body of the container, and also for handling the bulky and/or heavy waste to be delivered.

SUMMARY OF THE INVENTION

In this frame, it is the main object of the present invention to provide a container for waste collection, in particular for differentiated waste collection, which is so realized as to overcome the drawbacks of the containers for waste collections currently known in the art.

In particular, it is one object of the present invention to provide a container for waste collection which is so conceived as to minimize the user's discomfort, effort and involvement during the operations necessary for depositing the waste and during the operations necessary for positioning the same inside the container.

It is another object of the present invention to provide a container for waste collection which is so realized as to improve the quality of the differentiated waste collection service.

It is a further object of the present invention to provide a container for waste collection which is so realized as to ensure a high level of hygiene, especially near the waste load opening, and hence to ensure decency of both the container and the area where it has been positioned.

These and other objects are achieved by the present invention through a container for waste collection, in particular for differentiated waste collection, incorporating the features set out in the appended claims, which are an integral part of the present description.

BRIEF DESCRIPTION OF THE DRAWINGS

Further objects, features and advantages of the present invention will become apparent from the following detailed description and from the annexed drawings, which are supplied by way of non-limiting explanatory example, wherein.

DETAILED DESCRIPTION OF THE PREFERRED EMBODIMENTS

Referring now to the annexed drawings, reference numeral 1 designates as a whole a container for waste collection, in particular for differentiated waste collection, according to the present invention.

The container 1 according to the present invention comprises a containment body 10, within which there is at least one collection compartment 20, said containment body 10 being provided with at least one top opening 30 for delivering waste into said collection compartment 20.

The container 1 comprises also a door 40 movably connected to the containment body 10 for selectively opening or closing said opening 30 and allowing or inhibiting access to the collection compartment 20.

The container 1 according to the present invention is of the type intended to be emptied from below, i.e., of the type comprising at least one load opening 30, for depositing the waste into the collection compartment 20, in the upper part of the containment body 10, while the waste can be removed from the collection compartment 20 of the container 1 through another opening (not shown in the annexed drawings, since it is of a known type) provided in the bottom part of the containment body 10.

Generally, containers of this type (to be emptied from below) are bell-shaped or have a quadrangular and/or rectangular cross-section. In the case of the container 1 according to the present invention, the containment body 10 has a quadrangular cross-section with rounded angles, wherein the area of said quadrangular cross-section decreases starting from the bottom part or base of the containment body 10 towards a top wall 10S of said containment body 10; as a consequence, the shape of the containment body 10 resembles a truncated cone with rounded or smoothed angles.

Furthermore, the body 10 of the container 1 according to the present invention consists of a shell that may be made as one suitably shaped element or, alternatively, as a given number of shaped (e.g., by moulding) components joined together through the use of various methods known in the art (e.g., screws, rivets, welding, spot welding, etc.).

The container 1 comprises coupling means 2 that permit coupling said container 1 to a hooking device, which is usually carried by a motor vehicle and is adapted to hook and lift the container 1 in order to empty the collection compartment by causing the waste to fall through the additional opening provided in the bottom part of the containment body 10; it should be noted that the motor vehicle and its hooking device are not shown in the annexed drawings.

Figure 3:
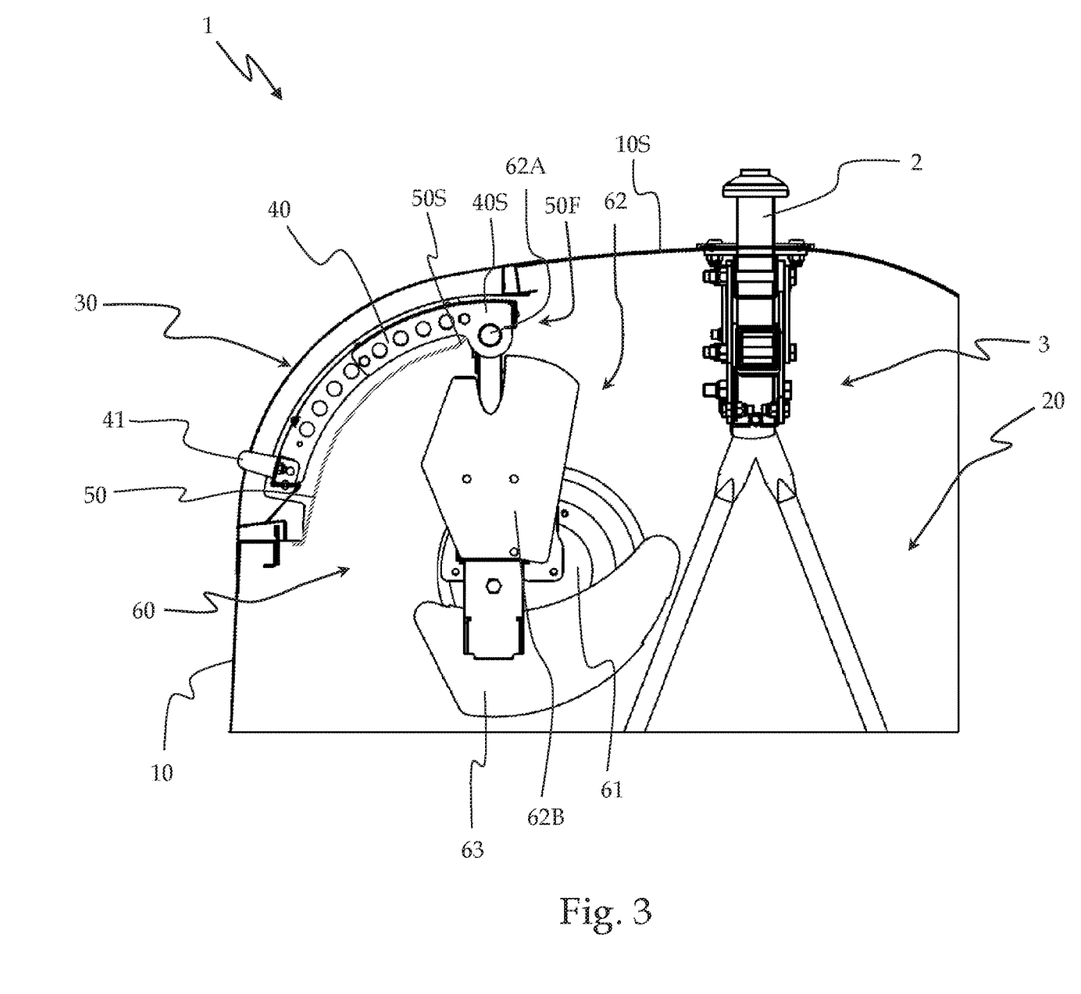
FIG. 3 is a sectional side view of a portion of the container of FIG. 1.
Figure 4:
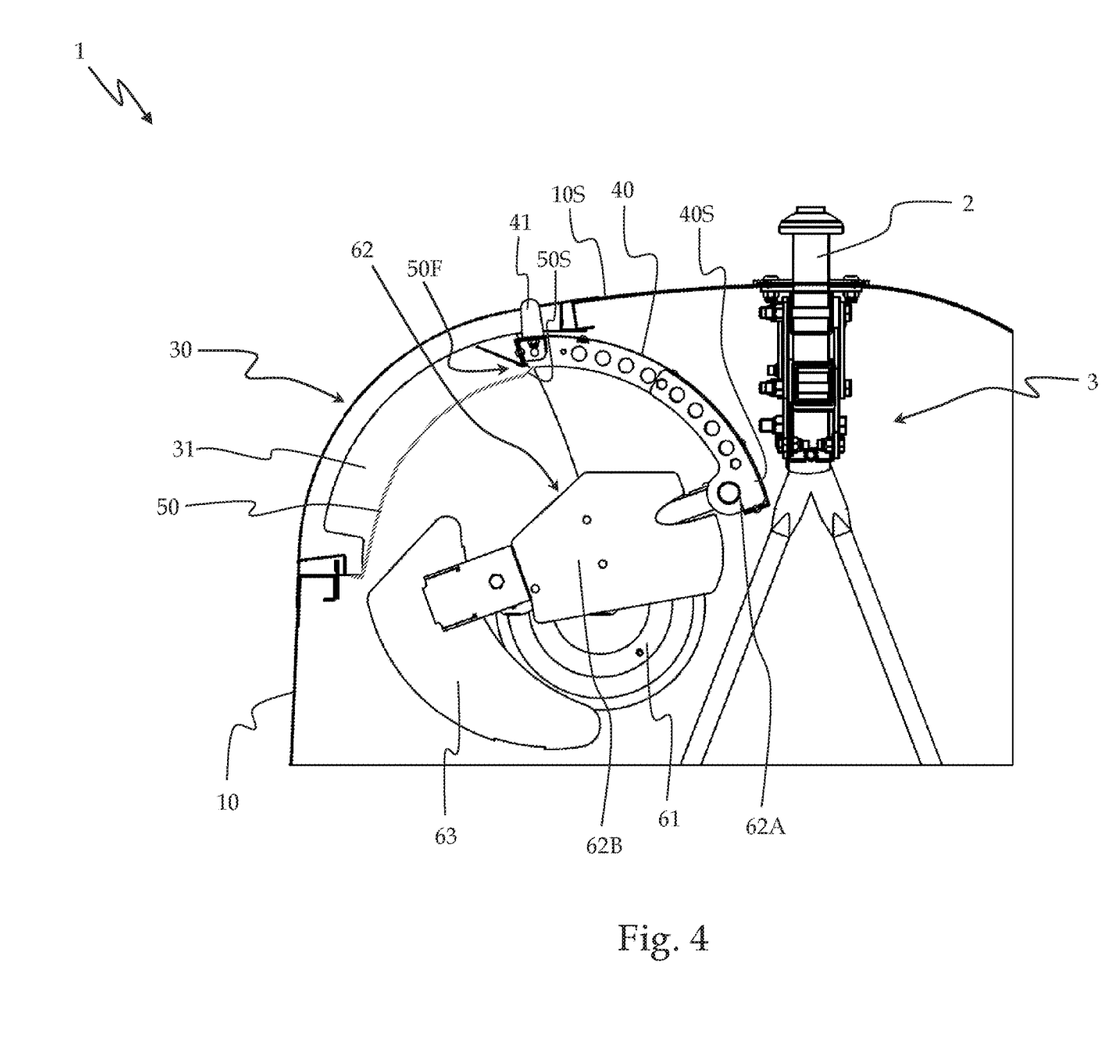
FIG. 4 is a sectional side view of a portion of the container of FIG. 2.

In a preferred embodiment, said coupling means 2 comprise a cylindrical bushing with one end firmly fixed to a top wall 10S of the containment body 10 of the container 1; as is particularly visible in FIGS. 3 and 4, the container 1 also comprises actuation means (designated as a whole by reference numeral 3 in such figures) associated with the cylindrical bushing 2, which are preferably positioned inside the containment body 10 of said container 1, said actuation means 3 being adapted to allow opening and/or closing at least one door associated with an opening in the bottom part of the container 1. Preferably, said actuation means 3 are substantially correspondent to those disclosed in European patent No. EP1172308B1 in the name of the present Applicant, the contents of which shall be deemed to have been fully incorporated in the present description.

Figure 1:
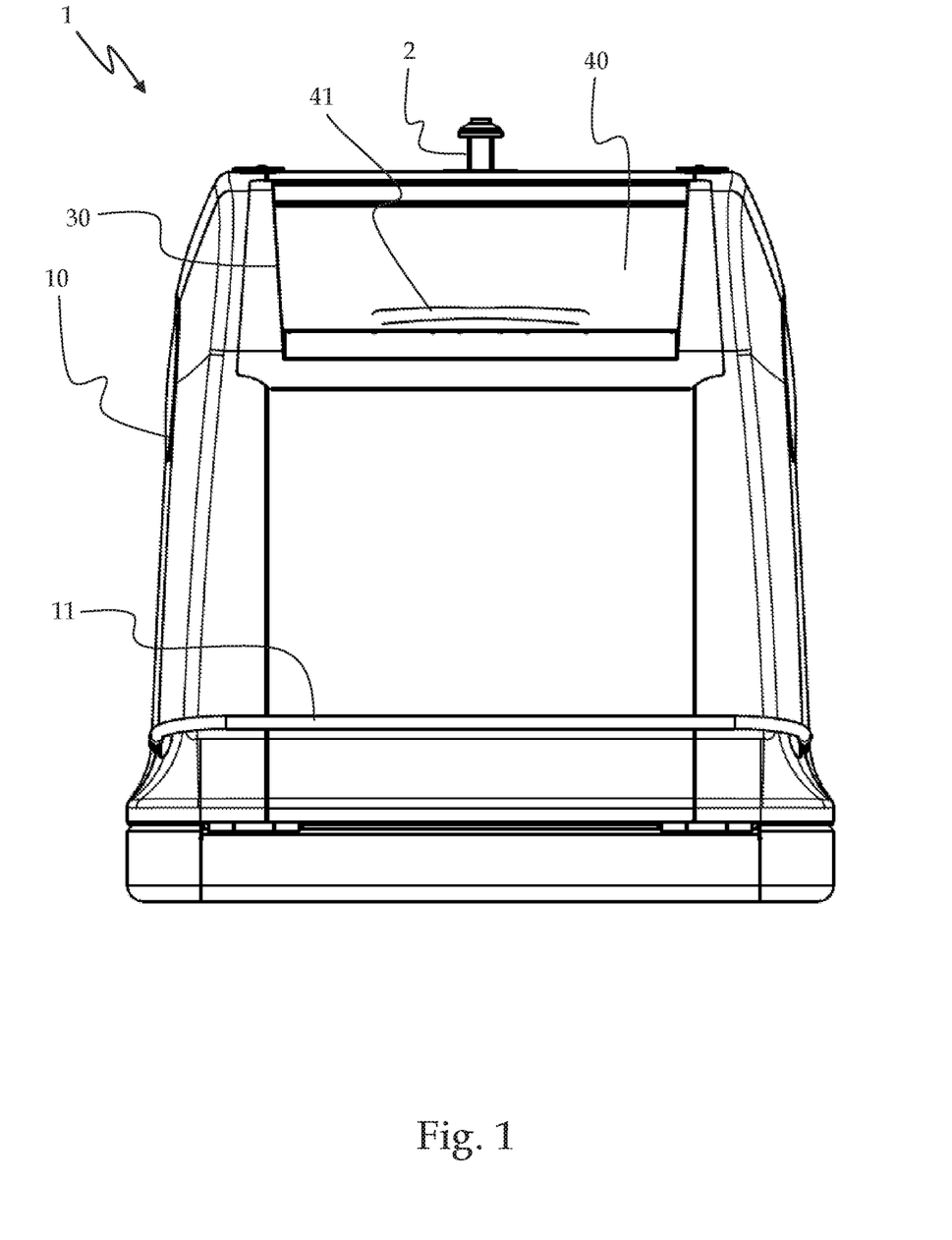
FIG. 1 is a front view of a container for waste collection according to the present invention, wherein said container is shown in a first operating condition.

The container 1 according to the present invention further comprises a mask 50 (visible in FIGS. 2, 3 and 4) interposed between the collection compartment 20 and the door 40 when said door 40 is in a first operating condition in which it closes the opening 30 (as shown in FIGS. 1 and 3), said mask 50 comprising at least one mouth 51 for delivering waste into the collection compartment 20. Said at least one mouth 51 may have a rectangular, square or circular section, or may be shaped according to the dimensions and shapes of the waste to be delivered through it; moreover, the dimensions of said at least one mouth 51 are such as to allow the introduction of specific waste into the collection compartment 20.

The mask 50 extends along the entire surface extension of the opening 30.

It must be pointed out that the mask 50 may be so realized as to comprise a plurality a mouths 51; in such a case, the mouths 51 may all be substantially equal (such a configuration being particularly appropriate when the container 1 is intended for one type of waste only), or each mouth 51 may differ from the other ones (such a configuration being particularly appropriate when the container 1 is intended for different types of waste and/or when the collection compartment 20 is divided into different sections intended to receive different types of waste).

The provision of a mask 50 provided with a plurality of mouths 51 makes it possible, therefore, to condition the waste delivery according to the types of waste indicated by the mask 50, and also to optimize the distribution of the waste inside the collection compartment 20, since the provision of multiple mouths 51 prevents the waste from being deposited by the user always in the same areas of the collection compartment 20, which would create an undesired accumulation of waste in a same area of the collection compartment 20.

In accordance with the present invention, said mask 50 is permanently fixed to the containment body 10 in such a way that it defines a slit 50F between an upper edge 50S of said mask 50 and the containment body 10, said slit 50F being adapted to permit the passage of the door 40.

In substance, the mask 50 is fixed to the containment body 10 in such a way that it cannot move relative to said containment body 10, since it is provided with side edges and/or a bottom edge firmly secured to the containment body 10, while the top edge 50S of the mask 50 is spaced apart from the containment body 10 and is not constrained to said containment body 10, so as to define said slit 50F that permits the passage of the door 40.

Figure 2:
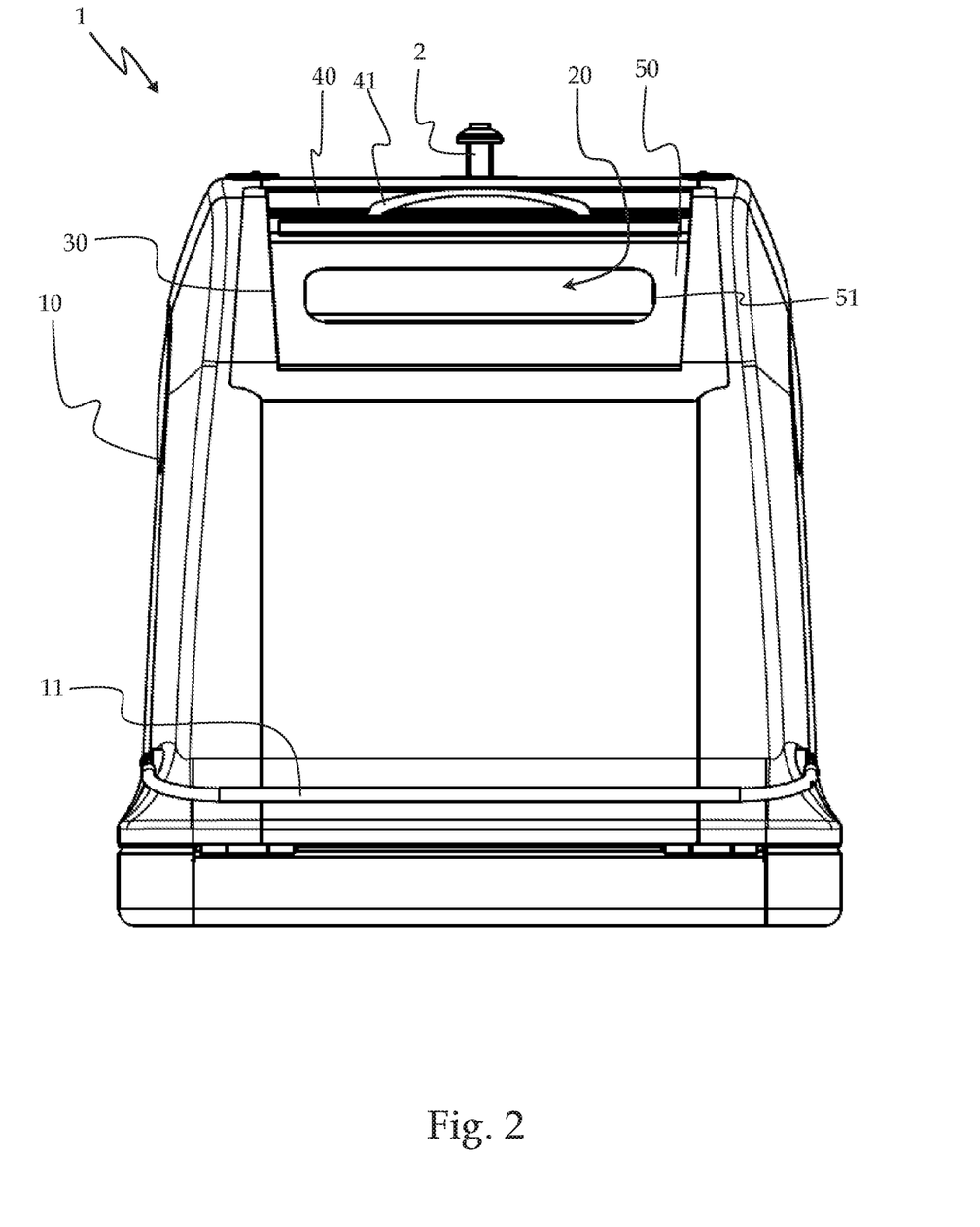
FIG. 2 is a front view of the container according to the present invention in a second operating condition.

Finally, in accordance with the present invention the door 40 is constrained to the containment body 10 by actuation means (designated as a whole by reference numeral 60 in the annexed drawings) that comprise at least one pin 61 adapted to rotate about a substantially horizontal axis relative to the containment body 10, so as to allow said door 40 to alternately switch:
  from a first operating condition in which it closes said at least one load opening 30, wherein the door 40 is positioned externally relative to the mask 50 (as shown in FIGS. 1 and 3);
  to a second operating condition in which it opens said at least one load opening 30, wherein the door 40 is positioned internally to the collection compartment 20 (as shown in FIGS. 2 and 4), in particular in said second operating condition said door 40 being positioned under a top wall 10S of the containment body 10.

As can be seen in the sectional side view of FIGS. 3 and 4, the actuation means 60 comprise a connection element 62 having a first portion 62A constrained to the door 40 and a second portion 62B constrained to the pin 61, so that the rotation of said pin 61 about said substantially horizontal axis is such as to allow said door 40 to follow a trajectory shaped as an arc of circumference both when switching from the first operating condition to the second operating condition and when switching from the second operating condition to the first operating condition. For example, said connection element 62 may consist of a bracket or a similar element.

In particular, the first portion 62A of the connection element 62 is constrained to the door 40 in proximity to an upper end 40S of said door 40; in this regard, it should be noted that said upper end 40S is that end of the door 40 which is closest to the top wall 10S of the containment body 10 when the door 40 is in the first operating condition in which it closes said at least one load opening 30 (i.e., in the position shown in FIG. 3).

The connection element 62 is preferably associated with balancing means 63 that allow balancing the assembly consisting of the door 40 and the actuation means 60 during the movement of said door 40 from the first closed operating condition to the second open operating condition, and vice versa.

In the embodiment shown in FIGS. 3 and 4, said balancing means 63 comprise a counterweight constrained to an extension 62C of the connection element 62, in particular said extension 62C developing from the second portion 62B in a direction opposite to the position of the first portion 62A of the connection element 62.

It is however clear that the balancing means 63 may also be realized in a different manner; by way of example, said balancing means 63 may comprise an elastic element (not shown in the annexed drawings, which may consist of a coil spring) having a first end constrained to the connection element 62 and/or to the pin 61 and a second end constrained, whether directly or indirectly (e.g., through linking elements), to the containment body 10.

In a preferred embodiment, the door 40 has an arched shape in a lateral cross-section, i.e., when viewed as in the sectional view of FIGS. 3 and 4.

Preferably, said at least one opening 30 comprises at least one lateral edge provided with a guide 31 (visible in FIG. 4) adapted to receive the lateral portions of the door 40 and guide the movement thereof from the first closed operating condition to the second open operating condition, and vice versa.

Said guide 31 has a shape substantially matching the shape of the lateral section of the door 40 and of the lateral portions thereof; as a consequence, in the preferred embodiment in which the door 40 has an arched shape in a lateral cross-section, also the guide 31 has an arched shape.

The container 1 according to the present invention may then comprise at least one damping element (not shown in the drawings) connected to the door 40 and/or to the actuation means 60 to slow down, in at least one tract, the movement of the door 40 from the second open operating condition to the first closed operating condition and/or the movement of the door 40 from the first closed operating condition to the second open operating condition. Said damping element may consist of a piston, an actuator or a similar element.

It should also be noted that the container 1 may comprise a handle 41 constrained to the door 40 and/or a pedal bar 11 connected to the door 40 and/or to the actuation means 60, wherein by actuating said handle 41 and/or said pedal bar 11 it is possible to move the door 40 from the first closed operating condition to the second open operating condition, and vice versa.

The container 1 according to the present invention may then comprise locking means (not shown in the drawings) adapted to hold the door 40 firmly locked with respect to the containment body 10 in said first closed operating condition.

For example, said locking means may comprise a lock (preferably of the mechatronic type) associated with a control unit to allow unlocking the door 40 upon recognition, by said control unit, of an identification code of a user authorized to deliver waste into said container 1.

The features of the present invention, as well as the advantages thereof, are apparent from the above description.

In particular, an important advantage of the container 1 according to the present invention lies in the fact that the provisions concerning the door 40 allow providing a container 1 for waste collection which is so realized as to minimize the user's discomfort, effort and involvement during the operations necessary for depositing the waste and during the operations necessary for positioning such waste inside a suitable container 1.

In fact, the particular provisions concerning the door 40 permit the user to deliver waste only by moving said door 40 from the first operating condition in which it closes said at least one opening 30 to the second operating condition in which it opens said at least one opening 30, and vice versa, such movement of the door 40 being accomplished by activating actuation means 60 which constrain the door 40 to the containment body 10, and which comprise a pin 61 adapted to rotate about a substantially horizontal axis relative to the containment body 10.

A further advantage of the present invention lies in the fact that the particular provisions concerning the door 40 and the actuation thereof make it possible to ensure a high level of hygiene, especially near the waste load opening 30; in fact, the peculiar provisions concerning the door 40 and its actuation means 60 make it possible to position the door 40 internally to the collection compartment 20 and under a top wall 10S of the containment body 10 when it is moved into the second operating condition in which it opens said at least one load opening 30, i.e., when waste needs to be introduced. It is apparent that such provisions prevent the door 40 from coming in contact with and being eventually soiled by the waste, thus ensuring decency of both the container 1 according to the present invention and the area where it has been positioned. Furthermore, such provisions provide access to the collection compartment 20 for depositing waste therein without the door 40 requiring much space in order to be opened and closed, unlike prior-art devices wherein the door 40 must be turned about a hinge in order to be opened and closed.

A further advantage deriving from the peculiar provisions concerning the door 40 and the actuation thereof lies in the fact that, in the second operating condition in which it opens said at least one load opening 30, the door 40 is positioned internally to the collection compartment 20 and under a top wall 10S of the containment body 10, and therefore is not in a position in which it can limit or reduce the available waste collection volume inside the collection compartment 20.

Yet another advantage of the present invention lies in the fact that the container 1 is so designed as to improve the quality of differentiated waste collection, since the features of the mask 50 allow every user to carry out a high-level separation of the different types of waste to be delivered.

The container for waste collection described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described container for waste collection, but may be subject to many modifications, improvements or replacements of equivalent parts and elements without departing from the inventive idea, as clearly specified in the following claims.

The invention claimed is:
1. A container for differentiated waste collection, the container comprising:—a containment body, within which there is at least one collection compartment, the containment body being provided with at least one top opening for delivering waste into the collection compartment, the at least one top opening having an upper end and an opposing lower end, the containment body also including a bottom opening located at a bottom part of the containment body through which waste in the collection compartment is emptied;—a door having a front face extending between an upper end and an opposing lower end and laterally extending between opposing sides, the door being movably connected to the containment body for selectively opening or closing the at least one top opening and allowing or inhibiting access to the collection compartment;—a second door that selectively opens and closes the bottom opening located at the bottom part of the containment body;—a mask having an arched portion that extends from a lower end disposed toward the lower end of the at least one top opening to an opposing upper end disposed toward the upper end of the at least one top opening, the upper end of the mask terminating at an upper edge, the mask being entirely disposed within the containment body so that the upper end of the mask is elevated higher than the lower end of the mask when the container is upstanding, the mask being interposed between the collection compartment and the door when the door is in a first operating condition in which the door closes the at least one top opening, the mask comprising at least one mouth extending through the arched portion of the mask for delivering waste into the collection compartment, wherein the mask has opposing lateral sides disposed at opposing ends of the upper edge, the opposing lateral sides being securely fixed to the containment body so that an elongated slit is bound between the upper edge of the mask and the containment body, a portion of the door being disposed within the slit when the door is in the first operating condition, wherein the door is constrained to the containment body by an actuator that comprises: at least one pin adapted to rotate about a substantially horizontal axis relative to the containment body, the at least one pin being spaced apart from the door; and a connection element having a first portion constrained to the door only at the upper end thereof and an opposing second portion constrained to the pin, wherein the actuator allows the door to alternately switch:—from the first operating condition in which the door closes the at least one top opening, wherein the door is positioned externally relative to the mask;—to a second operating condition in which the door opens the at least one top opening, wherein the door is positioned internally to the collection compartment and is positioned under a top wall of the containment body when in the second operating condition and wherein when the door is in the second operating condition and the collection compartment is empty of waste, waste can freely travel from the at least one mouth of the mask and through the collection compartment to contact the second door at the lower end of the containment body, and
   a coupler upwardly projecting from the containment body, the coupler being configured to engage with a lift that lifts the containment body via the coupler during emptying of the collection compartment of the containment body through the bottom opening.

2. The container according to claim 1, wherein the actuator is configured so that the rotation of the at least one pin about the substantially horizontal axis is such as to allow the door to follow a trajectory shaped as an arc of circumference both when switching from the first operating condition to the second operating condition and when switching from the second operating condition to the first operating condition.

3. The container according to claim 1, wherein the first portion of the connection element is constrained to the upper end of the door at a location between and spaced apart from the opposing sides of the door.

4. The container according to claim 2, wherein the connection element is associated with a balance that allows balancing an assembly consisting of the door and the actuator during the movement of the door from the first operating condition to the second operating condition, and vice versa.

5. The container according to claim 1, further comprising:
a counterweight; and
an extension projecting from the second portion in a direction opposite to a position of the first portion of the connection element, the counterweight being secured to the extension so that the counter weight is spaced apart from the door and the connection element.

6. The container according to claim 4, wherein the balance comprises an elastic element having a first end constrained to the connection element and/or to the pin and a second end constrained, whether directly or indirectly, to the containment body.

7. The container according to claim 1, wherein the door has an arched shape in a lateral cross-section.

8. The container according to claim 1, wherein the at least one top opening comprises at least one lateral edge provided with a guide adapted to receive lateral portions of the door and guide the movement thereof from the first operating condition to the second operating condition, and vice versa, the guide having a shape substantially matching a shape of a lateral section of the door and of the lateral portions thereof.

9. The container according to claim 1, wherein the container comprises at least one damping element connected to the door and/or to the actuation means to slow down, in at least one tract, the movement of the door from the second operating condition to the first operating condition and/or the movement of the door from the first operating condition to the second operating condition.

10. The container according to claim 1, wherein the container comprises locking means adapted to hold the door firmly locked with respect to the containment body in the first operating condition, the locking means comprising a lock associated with a control unit to allow unlocking the door upon recognition, by the control unit, of an identification code of a user authorized to deliver waste into the container.

11. The container according to claim 1, wherein a section of the door continuously passes through the slit as the door is moved between the first operating condition and the second operating condition.

12. The container according to claim 1, further comprising:
a portion of the door having an arched shape in a lateral cross-section.

13. The container according to claim 12, wherein the arched portion of the mask is complementary to the arch shape of the door.

14. The container according to claim 1, wherein the upper end of the mask is disposed toward a first end of the at least one top opening and the lower end of the mask is disposed toward an opposing second end of the at least one top opening.

15. The container according to claim 1, wherein the entire mask is disposed at a forward end of the container forward of a first end of the door when the door is in the first operating condition.

16. The container according to claim 1, wherein the mask comprises two or more mouths through the arched portion of the mask.

17. The container according to claim 1, further comprising an actuator at least partially disposed within collection compartment of the containment body and engaging with the coupler, the actuator allowing opening or closing of the second door.

* * * * *